United States Patent

Masao

[11] Patent Number: 5,963,326
[45] Date of Patent: Oct. 5, 1999

[54] ELLIPSOMETER

[76] Inventor: Katsuya Masao, 7190 6-19-13 Nishikicho, Tachikawashi Tokyo, Japan

[21] Appl. No.: 08/978,268

[22] Filed: Nov. 25, 1997

[30] Foreign Application Priority Data

Nov. 25, 1996 [JP] Japan ................................ 8-352516
Nov. 29, 1996 [JP] Japan ................................ 8-354278

[51] Int. Cl.$^6$ ........................... G01J 4/00; G01B 11/24
[52] U.S. Cl. ..................... 356/369; 356/364; 356/365; 356/376
[58] Field of Search .................. 356/364, 365, 356/369, 376, 367, 118; 359/557

[56] References Cited

U.S. PATENT DOCUMENTS

| | | | |
|---|---|---|---|
| 4,077,720 | 3/1978 | Kasai | 356/118 |
| 4,516,855 | 5/1985 | Korth | 356/367 |
| 5,166,752 | 11/1992 | Spanier et al. | 356/369 |
| 5,648,871 | 7/1997 | Okuyama et al. | 359/557 |
| 5,737,084 | 4/1998 | Ishihara | 356/376 |

*Primary Examiner*—Frank G. Font
*Assistant Examiner*—Roy M. Punnoose
*Attorney, Agent, or Firm*—Armstrong, Westerman, Hattori, McLeland, & Naughton

[57] ABSTRACT

The present invention discloses an ellipsometer using incident light having a wide beam diameter, comprising: a collimator for making the light parallel; a polarizer for transforming the light into a suitable linearly polarized state and radiating onto the sample; a beam expander for expanding the light to the size required for a single measurement; an objective lens composed of an afocal lens system for capturing the light reflected from the sample; an analyzer for converting the reflected light to suitable linearly polarized light; an imaging lens composed of an afocal lens system for forming an image of the sample on a image sensor; and, a image sensor; whereby, measurement of the polarized light can be performed at high speed and high resolution.

10 Claims, 2 Drawing Sheets

ELLIPSOMETER

BACKGROUND OF THE INVENTION

1. Field of the Invention

This invention relates to an ellipsometer that uses light beam having wide cross-section, and more particularly, to the measurement of thin films, such as an oxide film formed on a semiconductor substrate, with high resolution.

2. Description of the Related Art

A known example of the prior art relating to an ellipsometer is U.S. Pat. No. 3,880,524 of Frederic H. Dill et al. issued on Apr. 29, 1975. In this prior art, an analyzer is rotated to change its azimuth and measure the change in the intensity of the transmitted light in order to measure the polarized state of light reflected from a single point on a sample.

However, since only one point on the sample can be measured for a single measurement, an extremely long time is required to measure the entire surface of the sample.

Another constitution is considered in order to speed up this measurement. Namely, light reflected from a sample surface is measured using light having a large cross-section as incident light and a image sensor such as a DDC area sensor. In the case of this constitution, however, since the length of the light path of the reflected light is not constant on the sample surface, it has not been possible to obtain clear images of the sample without being obscured.

SUMMARY OF THE INVENTION

The object of the present invention is to provide an ellipsometer using reflected light having a wide beam cross-section that is able to measure the film thickness and refractive index of a sample at high speed and high resolution.

In order to achieve this object, the following constitution is employed in the present invention. Namely, the present invention provides an ellipsometer using incident light having a wide beam diameter, comprising: a collimator for making the light parallel; a polarizer for transforming the light into a suitable linearly polarized state; a beam expander for expanding the light to the size required for a single measurement and radiating onto the sample; an objective lens composed of an afocal lens system for capturing the light reflected from the sample; an analyzer for converting the reflected light to suitable linearly polarized light; an imaging lens composed of an afocal lens system for forming an image of the sample on a image sensor; and, a image sensor; whereby, measurement of ellipsometry can be performed at high speed and high resolution.

BRIEF DESCRIPTION OF THE DRAWINGS

The object, characteristics and other incidental characteristics of the present invention as described above become clear by referring to the drawings indicated below.

DESCRIPTION OF THE PREFERRED EMBODIMENTS

Figure 1:
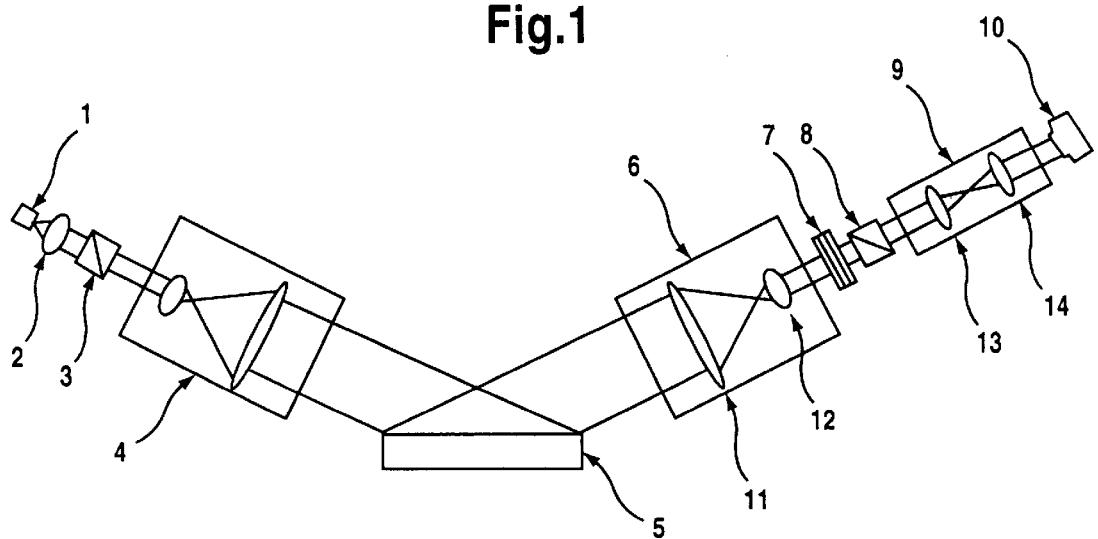
FIG. 1 is a general view that explains the ellipsometer of a first embodiment of the present invention.

The same reference numerals are used throughout the entire explanation to indicate those components that have identical or similar functions. FIG. 1 provides an explanation of the entire constitution of an ellipsometer of a first embodiment of the present invention. In FIG. 1, 1 is a light source such as a laser diode, 2 is a collimator lens, 3 is a polarizer, 4 is a beam expander, 5 is a sample, 6 is an afocal lens system, 7 is a quarter wave plate, 8 is an analyzer, 9 is an afocal lens system, 10 is a image sensor such as DDC area sensor, and 11, 12, 13 and 14 are thin lenses.

Monochromatic light from light source 1 is transformed into parallel light by collimator lens 2, and then into linear polarized light by polarizer 3. The resulting light is then expanded to a suitable diameter by beam expander 4. The expanded parallel light obtained in this manner is radiated onto sample 5 at a suitable incident angle, and an image is formed from the reflected light on image sensor 10 after passing through $1^{st}$ afocal lens system 6, wave plate 7, analyzer 8 and $2^{nd}$ afocal lens system 9.

If the parallel light formed at collimator lens 2 already has a suitable beam diameter, then beam expander 4 can be omitted.

In order to perform ellipsometric measurement in this constitution, the azimuth of polarizer 3 on the incident side, or wave plate 7 or analyzer 8 on the reflecting side must be individually or collectively changed, for example rotating the devices around the optical axis, followed by measurement of the light intensity on image sensor 10.

$1^{st}$ afocal lens system 6 is composed of two thin lenses 11 and 12. This system converts the diameter of the light beam of the reflected light to equal to or less than the effective aperture of polarizing elements 7 and 8. $2^{nd}$ afocal lens system 9 is composed of two thin lenses 13 and 14, and further converts the light beam to a size approximately equal to the image size of image sensor 10. The ratio of the focal distances between $1^{st}$ lens 11 and final lens 14 is the ratio between the measuring range of sample 5 and the image size of image sensor 10.

The position of each lens is set so that the actual image of the sample placed at a finite distance from lens surface 11 is formed on image sensor 10. In general, a virtual image of the sample is formed by $1^{st}$ afocal lens system 6, after which the actual image of the sample is formed on image sensor 10 by $2^{nd}$ afocal lens system 9.

In ellipsometer, a parallel and polarized light beam which is radiated onto a sample at a suitable incident angle after which the polarized state of the reflected light is measured and the optical constant of the thin film is calculated from the change in the polarized state.

If the incident beam is transformed into a parallel light beam having a certain spread, the two-dimensional distribution of the optical constant of sample 5 can be measured by forming an image of the reflected light beam at that time on two-dimensional image sensor 10 such as an area sensor. In addition, if image sensor 10 is a one-dimensional line sensor, then the one-dimensional distribution of the optical constant of sample 5 can be measured.

In order to perform ellipsometric measurements in this manner, it is necessary to secure a depth of focus for the optics on the reflecting side to a depth at which the light is considered to be completely attenuated. When the sample comprises a multilayer film in particular, consideration of this point becomes important. Ellipsometer of the prior art, in which only one point was measured using a narrow light beam was radiated on a single point followed by measurement of the reflected light with a photosensor, the concept of image formation was not necessary. On the other hand, in the case of using multielement image sensors, since the area sensor or line sensor of the reflecting side is considered to be the integration of a photosensor, when limited to this concept, the concept of image formation also appears to be unnecessary for two-dimensional measurement.

However, samples cannot generally be considered to be optically uniform over their entire surface. The surface of sample 5 measured by ellipsometry is normally considered to be in the form of a nearly mirrored surface, with only slight surface irregularities and non-uniformities in the internal structure. Thus, the main component of the reflected light is light reflected from a mirrored surface, while the remainder consists of a slight amount of scattered light produced from optical non-uniformities in sample 5. Measurement is performed while placing this type of sample 5 at a finite distance from the optics on the reflecting side. Thus, when measuring multiple points two-dimensionally using a wide beam of light for the incident light, conditions for imaging formation must be satisfied to enable each measurement point to be measured mutually independently.

If the optics of the ellipsometer on the reflecting side was composed in the form of afocal lens system 6 and 9, although the image of an object infinitely far away could be formed infinitely far away, the image of an object at a finite distance could be formed at a finite distance.

Since the light reflected from a mirrored surface, which comprises the main component of the reflected light, is a light beam in which lights are parallel, it can be considered to be light in parallel with the optical axis from an object infinitely far away. In the case of two-dimensional ellipsometer as well, the light should simply be measured for this main component.

On the other hand, with respect to the scattered light produced due to surface irregularities and non-uniformities in the internal structure of sample 5, a lens system is arranged so as to satisfy image forming conditions for the image of an object at a finite distance.

In addition, with respect to the magnification of the lens system, the total magnification of afocal lens systems 6 and 9 should be determined so as to satisfy the relationship between field of view of the sample 5 surface and the resolution of image sensor 10.

The case in which the ellipsometer composed in this manner gives correct results is the case in which sample 5 is considered to be optically uniform within the range of the resolution on the surface of sample 5, namely the width of the region of sample 5 on which an image is formed in unit pixels of image sensor 10.

The following provides a detailed explanation of another embodiment of the present invention.

Figure 2:
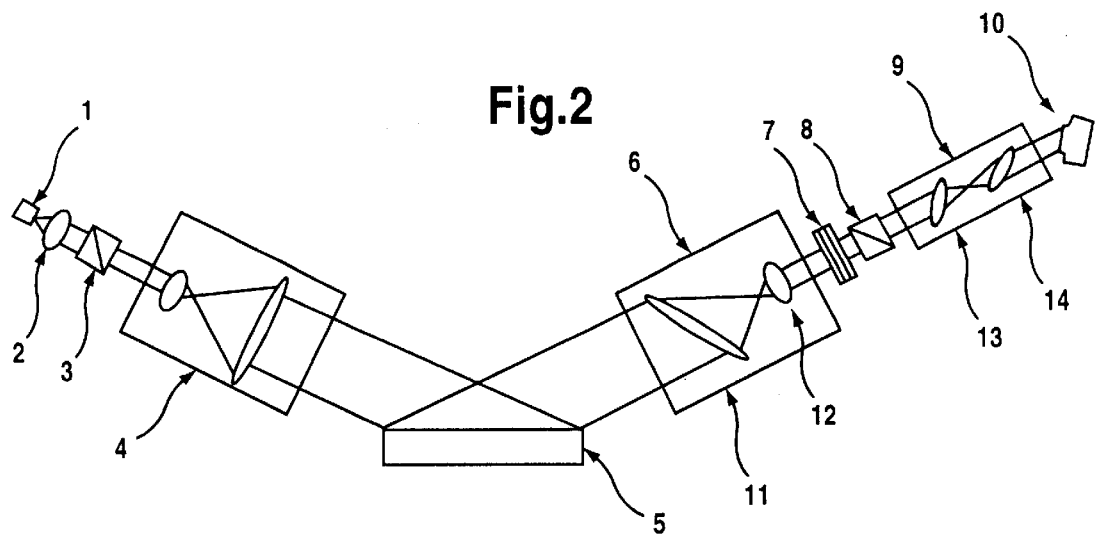
FIG. 2 is a general view that explains the ellipsometer of a second embodiment of the present invention.

FIG. 2 represents a second embodiment of the present invention.

In FIG. 2, the method by which lenses 11 and 12 which compose first afocal lens system 6 and lenses 13 and 14 which compose second afocal lens system 9 and image sensor 10 are arranged on the optical axis is different in comparison with FIG. 1. In this embodiment, these optical elements are attached on an incline relative to the optical axis.

In general, sample 5 is arranged on an incline relative to the optical axis when measuring a sample with an ellipsometer. In this case, the imaging plane of sample 5 is also on an incline relative to the optical axis. In order to form an ideal image using an ideal lens system at this time, it is necessary that the extended planes of lens systems 6 and 9, image sensor 10 and sample 5 intersect on the same straight line, namely that the Scheimpflug condition be satisfied.

In this second embodiment, lens 11, 12, 13 and 14 as well as image sensor 10 are each installed on an incline so that the respective extended planes of two thin lenses 11 and 12, which compose $1^{st}$ afocal lens system 6, two thin lenses 13 and 14, which compose $2^{nd}$ afocal lens system 9, and image sensor 10 intersect on the same straight line as sample 5. The positions on the central optical axis of lens system 6 and 9 as well as image sensor 10 are arranged such that the actual image of sample 5 is formed on image sensor 10 as explained in the first embodiment.

Figure 3:
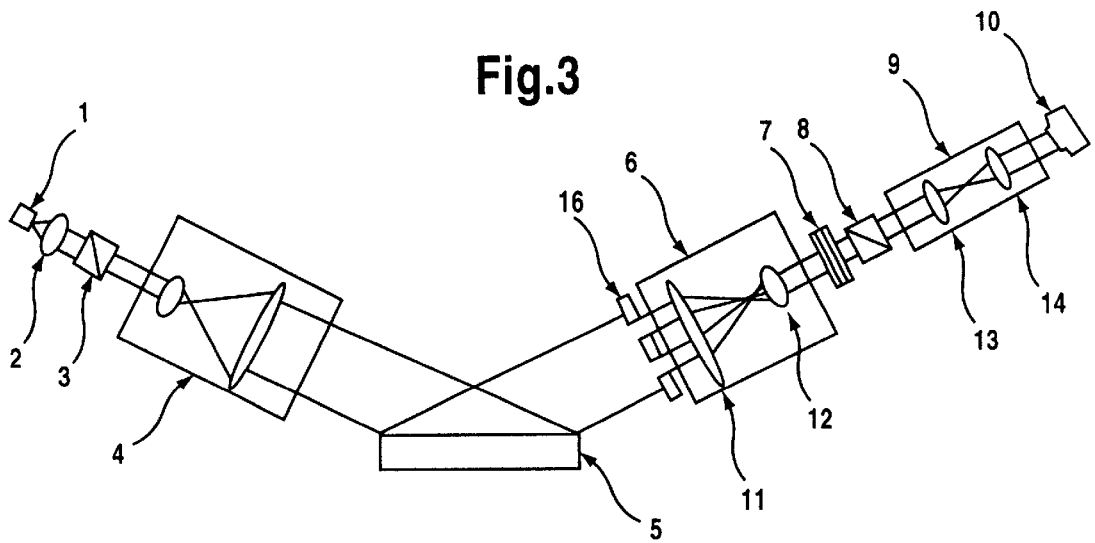
FIG. 3 is a general view that explains the ellipsometer of a third embodiment of the present invention.
Figure 4:
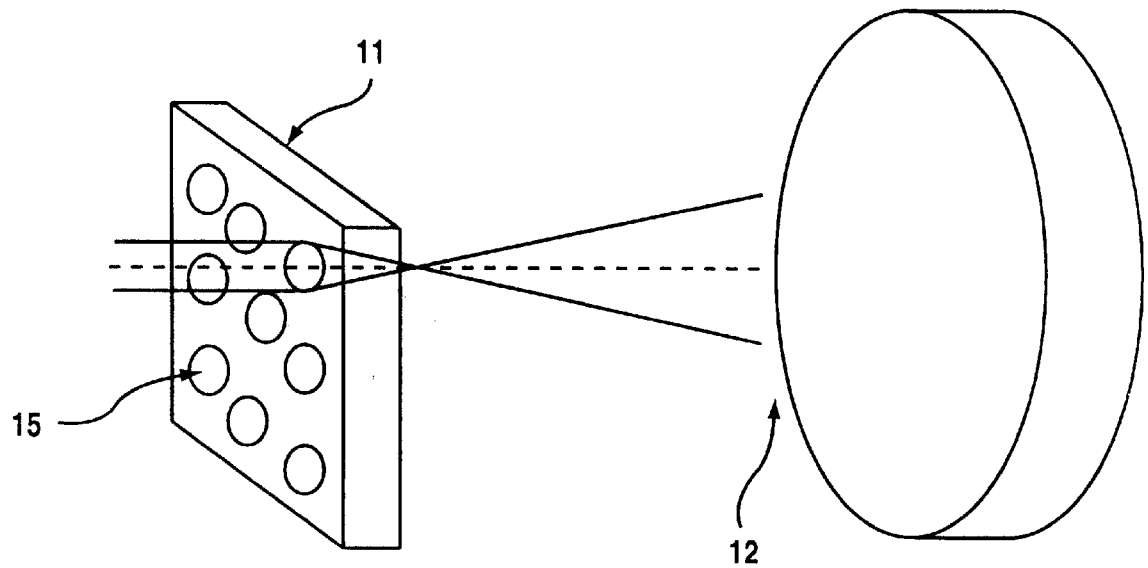
FIG. 4 provides an explanation of the lenses used in the ellipsometer of the third embodiment of the present invention.

FIGS. 3 and 4 represent a third embodiment of the present invention.

In FIG. 3, the constitution of $1^{st}$ afocal lens system 6 is different in comparison with FIG. 1.

$1^{st}$ afocal lens system 6 is composed of two lenses 11 and 12.

Lens 11 is composed of a plurality of microlenses 15 in the form of convex lenses. In addition, a diaphragm 16 is provided to block out mutual crosstalk light between microlenses 15. Microlenses 15 have a high magnification factor, and serve to partially magnify the inner surface of sample 5.

Similarly effects are obtained if lens 12, and not lens 11, is composed of microlenses.

$2^{nd}$ afocal lens system 9 is a zoom lens which enables the resolution and magnification of the inner surface of sample 5 to be adjusted at measurement of sample 5.

Figure 5:
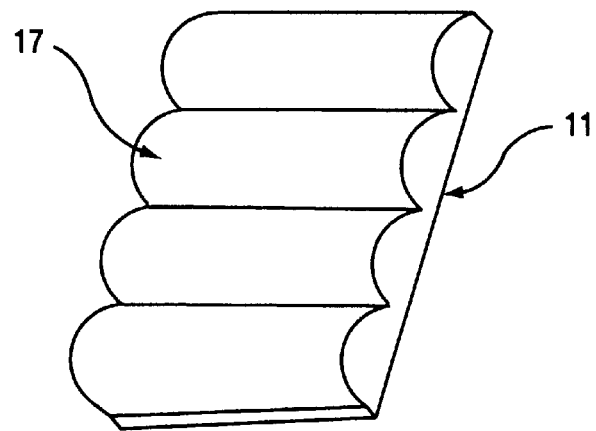
FIG. 5 provides an explanation of the lenses used in the ellipsometer of the fourth embodiment of the present invention.

FIG. 5 represents a fourth embodiment of the present invention.

Although this fourth embodiment is composed in the same manner as the above-mentioned third embodiment, the structure of thin lens 11 shown in FIG. 5 is different from the third embodiment.

$1^{st}$ afocal lens system 6 is composed of two lenses 11 and 12.

Lens 11 is composed of a plurality of cylindrical lenses 17. In addition, a diaphragm 18 is provided to block out mutual crosstalk light between cylindrical lens 17. Cylindrical lenses 17 have a high magnification factor which serves to partially magnify the inner surface of sample 5 in the form of lines.

Similar effects are obtained if lens 12, and not lens 11, is composed of cylindrical lenses.

$2^{nd}$ afocal lens system 9 is a zoom lens which enables the resolution and magnification of the inner surface of sample 5 to be adjusted at measurement of sample 5.

What is claimed is:

1. An ellipsometer for measuring a sample, comprising:

a light source that radiates light;

a collimator for making incident light parallel;

a polarizer for converting said light into linearly polarized light and radiating said polarized light onto the sample;

an objective lens system for receiving light reflected from said sample, said objective lens system including an afocal lens system; an analyzer for converting said reflected light into linearly polarized light; an imaging lens system for forming an image of the sample on an image sensor, said imaging lens system including an afocal lens system; and, an image sensor for detecting the image of said sample.

2. An ellipsometer as set forth in claim 1 wherein the lens systems are composed such that said objective lens system forms a virtual image of said sample, and said imaging lens system forms an actual image of said sample on said image sensor.

3. An ellipsometer as set forth in claim 2 wherein said lenses and image sensor are installed on an incline so that the respective extended planes of each lens, image sensor and sample intersect on the same straight line.

4. An ellipsometer as set forth in claim 1 wherein a beam expander is provided between said polarizer and said sample to expand the diameter of the incident light beam.

5. An ellipsometer as set forth in claim 1 wherein a zoom lens is used for the object lens system to allow adjustment of image magnification factor.

6. An ellipsometer as set forth in claim 1 wherein a zoom lens is used for the imaging lens system to allow adjustment of image magnification factor.

7. An ellipsometer as set forth in claim 1 wherein one thin lens of said objective lens system is composed of a microlens array in which is formed convex lenses.

8. An ellipsometer as set forth in claim 1 wherein one thin lens of said imaging lens system is composed of a microlens array in which is formed convex lenses.

9. An ellipsometer as set forth in claim 1 wherein one thin lens of said objective lens system is composed of a cylindrical lens array.

10. An ellipsometer as set forth in claim 1 wherein one thin lens of said imaging lens system is composed of a cylindrical lens array.

* * * * *